United States Patent [19]

Vogt et al.

[11] 3,960,821

[45] June 1, 1976

[54] CHLORONITROSYLATED, CHLOROSULFONATED HYDROCARBON POLYMERS AND A PROCESS FOR THE PREPARATION THEREOF

[75] Inventors: Herwart C. Vogt, Grosse Ile; Charles F. Deck, Trenton; Pauls Davis, Gibraltar, all of Mich.

[73] Assignee: BASF Wyandotte Corporation, Wyandotte, Mich.

[22] Filed: Dec. 13, 1974

[21] Appl. No.: 532,323

[52] U.S. Cl. ............... 260/79.3 A; 260/23 XA; 260/23 H; 260/23.7 B; 260/42.32; 260/42.36; 260/42.41; 260/79.3 R; 260/79.5 C; 526/11.1; 526/19; 526/41; 526/42; 526/348; 526/352; 528/481
[51] Int. Cl.$^2$ ............... C08F 28/02; C08G 75/24; C08K 5/02; C08K 5/36
[58] Field of Search ............... 260/79.3 R, 79.3 A, 260/94.9 H

[56] References Cited
UNITED STATES PATENTS

| | | | |
|---|---|---|---|
| 2,405,971 | 8/1946 | McAlevy | 260/94.9 H |
| 2,586,363 | 2/1952 | McAlevy | 260/79.3 R |
| 2,646,422 | 7/1953 | Strain | 260/79.3 R |
| 3,050,503 | 8/1962 | Natta et al. | 260/79.3 R |
| 3,079,362 | 2/1963 | Nersasian | 260/79.3 R |
| 3,288,762 | 11/1966 | Maynard | 260/79.3 R |
| 3,296,222 | 1/1967 | Dixon et al. | 260/79.3 R |
| 3,723,404 | 3/1973 | Davis et al. | 260/79.3 R |
| 3,763,134 | 10/1973 | Davis et al. | 260/94.9 H |

*Primary Examiner*—Ronald W. Griffin
*Attorney, Agent, or Firm*—Norbert M. Lisicki; Bernhard R. Swick; Robert E. Dunn

[57] ABSTRACT

Hydrocarbon polymers which have been chloronitrosylated and chlorosulfonated to introduce nitrogen and sulfur containing polar groups into the polymer or composites of chlorosulfonated and chloronitrosylated hydrocarbon polymers may readily be crosslinked with heat forming products having improved physical properties.

11 Claims, No Drawings

CHLORONITROSYLATED, CHLOROSULFONATED HYDROCARBON POLYMERS AND A PROCESS FOR THE PREPARATION THEREOF

BACKGROUND OF THE INVENTION

1. Field of the Invention

This invention relates to a process of crosslinking organic polymers. More specifically, this invention relates to a process of preparing hydrocarbon compounds which contain polyfunctional chlorosulfonic and chloronitroso groups and to the crosslinked polymers thereof.

2. Prior Art

Known crosslinking systems for polymers generally have such undesirable features as working effectively only at highly elevated temperatures requiring unsaturated polymers, or being adversely affected by air and moisture. The prior art is limited to teaching the preparation of chloronitrosylated polymers by incorporating the chloronitroso groups in the polymer itself. U.S. Pat. No. 3,723,404 teaches the preparation of chloronitrosylated polymers by reacting the polymer with nitrosyl chloride or chlorine and nitric oxide in the presence of a free radical catalyst and in the presence of a solvent. The resulting chloronitrosylated polymer may then be crosslinked by treatment with heat either in the presence or absence of any fillers. U.S. Pat. No. 3,763,134 teaches the preparation of chloronitrosylated polymers by reacting the polymer with nitrosyl chloride or chlorine and nitric oxide in a two-phase system employing fluorocarbons as the reaction medium.

The literature is also filled with references to polymers containing chlorosulfonate groups. Nowhere, however, does the prior art teach the beneficial effect of the combined chlorosulfonic and chloronitroso groups in the same polymeric structure.

SUMMARY OF THE INVENTION

The present invention relates to novel hydrocarbon polymers containing polar groups and to the preparation thereof. More particularly, the invention relates to modified hydrocarbon polymers containing chlorine, nitrogen, and sulfur groups. These modified hydrocarbon polymers may be crosslinked by heat into polymers having improved physical nd chemical properties as indicated by better oil swell data. The products of the present invention are accomplished by (1) either a solution or two-phase slurry process incorporating the hydrocarbon polymer and reacting said polymer with either nitrosyl chloride, chlorine and nitric oxide, chlorosulfonic acid, or chlorine and sulfur dioxide, or (2) blending chlorosulfonated polymers with chloronitrosylated polymers. The resulting chlorosulfonated and chloronitrosylated polymers may be crosslinked upon treatment with heat, to yield a polymer having improved physical and chemical properties.

DESCRIPTION OF THE PREFERRED EMBODIMENTS

In accordance with the present invention, chlorosulfonated and chloronitrosylated polymers are prepared by either dissolving the polymer in a solvent or employing a two-phase slurry process which comprises contacting the polymers with chlorosulfonic acid or sulfonyl chloride followed by contacting the polymer with nitrosyl chloride or chlorine and nitric oxide in a fluorocarbon medium in the presence of a catalyst. Polymers which may be chlorosulfonated and chloronitrosylated according to the present invention generally have a molecular weight from about 1,000 to 1,000,000, preferably from about 10,000 to 150,000. The polymers may be completely saturated or they may contain residual reactive ethylenic unsaturation or functional groups such as halogen atoms or carbonyl, carboxyl, and hydroxyl groups. Representative polymers include polyolefins such as polyethylene, polypropylene, polybutylene, the higher polyalkylenes and copolymers prepared from mixtures of olefins such as poly(ethylene-propylene); chlorinated polyolefins such as chlorinated polyethylene, polystyrenes such as polystyrene, poly(methylstyrene), poly (styrene-butadiene), polybutadiene, polyisobutylene, chloroprene, butyl rubber, polysulfone; and polyvinyl and polyvinylidene halides such as polyvinylchloride, polyvinylidenechloride, polyvinylfluoride and polyvinylidenefluoride.

The process of the present invention comprises reacting a polymer with sulfonyl chloride or chlorine and sulfur dioxide and nitrosyl chloride or chlorine and nitric oxide in the presence of a catalyst such as light, heat or a free radical initiator. It is contemplated that these polymers may have a chlorine content of from 0.1 to about 68 weight percent, preferably 5 weight percent to about 45 weight percent, a nitrogen content from 0.1 to about 5 weight percent, preferably 0.1 to about 2 weight percent and a sulfur content from 0.05 to about 5 weight percent, preferably from 0.1 to about 3 weight percent. Representative free radical initiators which may be employed in the preparation of the polymers of the present invention include such initiators as hydrogen peroxide, t-butyl peroxide, di-t-butyl peroxide, benzoyl peroxide, tertiary butyl hydroperoxide, dicumylperoxide, and azo compounds such as azo-bis-(isobutyronitrile). In addition, initiators which may be employed are cumene hydroperoxide, dichlorobenzoyl peroxide, tertiary butyl perbenzoate, acetyl benzoyl peroxide, caprylyl peroxide, lauryl peroxide, hydroxyheptyl peroxide, methyl ethyl ketone peroxide, 1-hydroxycyclohexyl hydroperoxide-1, ditertiary butyl perphthalate dibenzyldiperoxide, 2,2-(tertiary butylperoxy)butane, bis-(para-bromobenzoyl) peroxide, bis-(parachlorobenzoyl) peroxide, bis-(succinyl) peroxide, and bis-(chloroacetyl) peroxide. As mentioned above, the polymers of the present invention are prepared either by dissolving the hydrocarbon polymer in an inert reaction medium or by employing a two-phase slurry. The inert reaction mediums which may be employed are those solvents or diluents which will not adversely affect the course of the reaction or the reaction products. Examples of such mediums include hydrocarbons such as chlorinated benzenes, carbon tetrachloride, chloroform, perchlorethylene and ethylene dichloride. The amount of reaction medium used will vary depending upon the particular medium employed and the molecular weight of the hydrocarbon polymer. Generally, however, the concentration of polymer in solvent will be from about 1 percent to 50 percent by weight solids, preferably from 1 percent to 25 percent by weight solids.

In employing the process as a two-phase slurry, fluorocarbons may be employed as the medium. Those fluorocarbons which may be employed are aliphatic or cycloaliphatic hydrocarbons having from 1 to 4 carbon atoms and from 4 to 10 halogen atoms providing that at least one halogen atom is fluorine. Representative fluorocarbons include tetrafluoromethane, bromotrifluoromethane, chlorotrifluoromethane, dibromodifluoromethane, dichlorodifluoromethane, trichlorofluoromethane, hexafluoroethane, 1,2,2-trichloro-1,1,2-trifluoroethane, 1,1,2,2-tetrachloro-1,2-difluoroethane, 1,2-dibromo-1,1,2,2-tetrafluoroethane, 1,2,2-tribromo-1,1,2-trifluoroethane, octafluoropropane, decafluorobutane, hexafluorocyclopropane, 1,2,3-trichloro-1,2,2-trifluorocyclopropane, octafluorocyclobutane, 1,1,2-dichloro-1,2,3,4,4-hexafluorocyclobutane, 1,2,3,4-tetrachloro-1,2,3,4-tetrafluorocyclobutane. The amount of fluoorocarbon used will also vary upon the particular fluorocarbon employed and the molecular weight of the polymer. However, the concentration of polymer in the fluorocarbon will be from 1 percent to 35 percent by weight solids, preferably from about 5 percent to 15 percent solids.

The reaction of the present invention is generally carried out at a temperature of between −30° and 125° C., preferably between 25° and 100° C. The particular temperature will depend upon the hydrocarbon polymer, the reaction medium whether it be fluorocarbon or chlorinated solvent, and the initiator as well as other reaction conditions such as the time of reaction and the pressures employed. The reaction may be carried out at atmospheric, superatmospheric or subatmospheric pressure. The time of reaction will vary with the reactants employed and the temperature of the reaction. However, from 1 to 60hours, preferably from 1 to 24 hours, will be sufficient to ensure that the reaction has occurred. After the chlorosulfonation and chloronitrosylation has been completed, the products are isolated by a filtration technique if fluorocarbons are used as the reaction medium. If chlorinated hydrocarbons are used as the reaction medium, the reaction mass temperature is cooled to room temperature or lower. The reaction mixture is then added to an organic solvent such as an alcohol which precipitates the polymer from solution. The polymer is then separated from the liquid phase by filtration or decantation or other suitable means.

Additionally, the effect of both chloronitroso groups and chlorosulfonate groups may be accomplished by blending a mixture of a chloronitrosylated polymer with a chlorosulfonated polymer as shown in subsequent Example 8.

The chloronitrosylated polymer may be incorporated in the chlorosulfonated polymer in any desired fashion. For example, it can be uniformly blended by simply milling the two polymers together on a conventional rubber mill or dissolving the chloronitrosylated polymer in a solution containing the chlorosulfonated polymer. By either means it is distributed throughout the other polymer and uniform crosslinking or other modification is effected when the blend is either subjected to heat or irradiation. Other means of mixing the chloronitroso polymer with the chlorosulfonated polymer will be apparent to those skilled in the art. In addition to the chloronitroso-chlorosulfonated containing polymer other additives can also be incorporated. The additives commonly used in rubber vulcanites can be used here also as, for example, extenders, fillers, pigments, plasticizers, stabilizers, and so forth. Obviously, there are many cases in which a filler is not required or desired and excellent results are achieved when only the chloronitroso-containing compounds are added.

The crosslinked polymers of this invention are hard, tough plastics which are substantially insoluble in various hydrocarbon solvents and chlorinated solvents such as chloroform, carbon tetrachloride, and methylene chloride. These polymers exhibit improved tensile properties over their uncured counterparts. The cured polymers range from rubbery materials to hard plastics with a wide variety of uses, e.g., machine parts and potting compositions. They are useful in various applications such as, for example, protective and decorative coating for various substrates including wood, metals, paper and plastics, as ingredients of tires for motor vehicles, tubing, pipes and other rubber articles and the like.

The chlorosulfonated and chloronitrosylated polymers of the present invention may be cured by heating to a temperature of from 75° to 225° C. Pressure may accompany the cure of the polymer. In general, the cure is carried out in the presence of a filler such as carbon black, magnesium oxide, or other basis oxides such as zinc, lead or calcium oxides. The cured polymers exhibit improved properties as indicated by better oil swell data.

In addition, the process of the present invention permits the crosslinking of a wide variety of high molecular weight satuıated polymers prepared by the polymerization of monomers containing at least one carbon-to-carbon double bond. The polymers which are crosslinked by the process may be formed into sheets or films or fibers after incorporation of the chloronitroso and chlorosulfono-containing polymers before effecting a cure by heating. These shaped forms may be prepared by extruding the compounded stock through suitable dies. They may also be prepared by dissolving the compounded stock in a volatile solvent and laying down a layer of the solution and allowing the solent to evaporate, or extruding a concentrated solution through a spinneret and the solution evaporated. The resulting films or fibers are then subjected to heat to crosslink or to cure. The compounded stock may be formed into thin sheets on roller mills and the sheets taken off as unsupported films. If desired, the films may be calendered onto substrates and the composite heated to vulcanize or crosslink the polymers.

The polymers which are crosslinked according to the present invention may be used generally in a fashion similar to polymers which have been crosslinked by known conventional curing procedures. However, the crosslinking process of the present invention yields polymers which show better oil swell properties. The vulcanized polymers may be used for injection molding, electrical insulation, supported and unsupported films and fibers, wrapping materials, and so forth. The polymers may be varied by the incorporation of compounding ingredients prior to the time the chloronitroso-chlorosulfono-containing polymers are cured. Suitable compounding ingredients are carbon black, pigments, stearic acid, and so forth.

Mixing of these polymers can be accomplished in dough mixers, high speed impeller mixers, paddle-type mixers and the like. For best results it is often preferred that further mixing is accomplished by the use of a three-roll mill such as is used in paint and ink manufacture. When a solid polymer is to be cured, the crosslinking agent may be dispersed on a rubber mill or in an internal mixer such as a Banbury mixer.

In mixing the chloronitroso-chlorosulfono polymers with either fluid polymers or millable gums the temperature must be kept below the decomposition point of the crosslinking agent to prevent premature curing. The decomposition points of the chloronitroso-chlorosulfono polymers are a function of the particular compound employed and the polymer in which the compound is dispersed. The temperatures utilized during the curing of the polymer is from about 30° to about 300° C. While the temperature is not particularly critical, it must be above the temperature at which the chloronitroso-chlorosulfono polymer decomposes in the system being cured. This temperature will, of course, vary with each particular chloronitroso compound.

Full curing of the polymers ordinarily takes from about one minute to about 24 hours, depending upon the temperatures employed. Preferred curing times range from 0.5 hour to 12 hours at temperatures ranging from about 100° to about 150° C. At these preferred curing temperatures sufficient cure to permit demolding occurs within from about 5 seconds to 5 minutes. This is due to the fast reactivity of the chloronitroso-chlorosulfono polymer once decomposition occurs. The present invention provides unlimited time for mixing, prolonged storage of the mixture and for filling the most complex molds. The curing equipment and curing procedures used in the present invention are conventional.

The following examples are illustrative of the present invention and, therefore, are not intended in any way as a limitation on the scope thereof. Parts and percents are by weight unless otherwise indicated. These examples illustrate both the methods of preparation of chloronitroso-chlorosulfono-containing compounds and the cured polymers obtained when these compounds are employed for crosslinking process. In these examples the percent chlorine was determined by the Mohr chlorine procedure and the percent nitrogen was determined by the Dumas nitrogen procedure, while the percent sulfur was determined by a gravimetric barium sulfate method. The physical properties of the cured polymer were determined according to standard ASTM procedures.

EXAMPLE 1

100 grams of a chlorosulfonated polyethylene containing 29 percent chlorine, 1.4 percent sulfur and having a specific gravity of 1.12 were placed into a four-liter flask containing 4210 grams of carbon tetrachloride. The mixture was rolled for two days until a slightly hazy solution was obtained. To this mixture 7.50 grams of nitrosyl chloride in 50 milliliters of carbon tetrachloride were added with stirring and the resulting mixture placed into sunlight. Upon completion of the reaction, which took approximately two hours, the resulting polymer was isolated by evaporating the carbon tetrachloride solvent under ambient conditions, followed by vacuum drying to constant weight. The polymer obtained analyzed as 0.42 percent nitrogen, 30.25 percent chlorine and 1.51 percent sulfur. This product was then formulated on a cold rubber mill with 40 parts of surface abrasion furnace carbon black, 4 parts of magnesium oxide, 2 parts of dipentamethylene-thiuram-hexasulfide, 3 parts of pentaerythritol, and 1 part of stearic acid. (See the Table below for compounding information.) The formulation was cured for 30 minutes at 300° F., employing 35 tons of press pressure.

The cured polymer exhibited the following physical properties:

| | |
|---|---|
| Tensile Strength, psi | 2907 |
| Elongation, % | 90 |
| Elongation Set, % | 1 |
| Graves Tear | 81 |
| Shore A Hardness | 88–85 |
| Shore D Hardness | 46–40 |
| 70 Hours at 100° C. | |
| ASTM No. 3 Oil | |
| Weight Increase, % | 34.8 |
| Volume Increase, % | 51.4 |

EXAMPLE 2

Employing the procedure of Example 1, 100 grams of chlorosulfonated polyethylene, with the same composition as noted in Example 1, were dissolved in 4,200 grams of carbon tetrachloride. To this mixture 2.5 grams of nitrosyl chloride in 50 milliliters of carbon tetrachloride were added and the resulting mixture exposed to sunlight. After 60 minutes reaction time, the polymer was isolated as noted in Example 1 and contained 0.30 percent nitrogen, 30.19 percent chlorine and 1.49 percent sulfur. The elastomer was compounded according to the formulations employed in the Table and cured for 30 minutes at 300° F., employing 35 tons of press pressure.

The cured polymer exhibited the following physical properties:

| | |
|---|---|
| Tensile Strength, psi | 2597 |
| Elongation, % | 77 |
| Elongation Set, % | 0 |
| Graves Tear | 80 |
| Shore A Hardness | 75—75 |
| Shore D Hardness | 41–35 |
| 70 Hours at 100° C. | |
| ASTM No. 3 Oil | |
| Weight Increase, % | 42.4 |
| Volume Increase, % | 60.9 |

EXAMPLE 3

100 grams of chlorinated polyethylene resin having a bulk density of 28 lbs./cu. ft., melt viscosity of 24 poises/1,000, 36 percent chlorine content and 0-2 percent residual crystallinity were dissolved in 4,000 grams of carbon tetrachloride, 5 grams of chlorine dissolved in 50 milliliters of carbon tetrachloride were added to this mixture and the resulting mixture exposed to sunlight for 30 minutes. Subsequently, 5.0 grams of nitrosyl chloride dissolved in 50 milliliters of carbon tetrachloride were added and the mixture again exposed to sunlight for a total of 5 hours. The resulting polymer was isolated while allowing the solvent to evaporate under ambient conditions, followed by vacuum drying to constant weight at room temperature. A product was obtained which contained 0.35 percent nitrogen and 37.19 percent chloride. The elastomer was compounded according to the formulation shown in the Table and cured for 30 minutes at 300° F. at 35 tons press pressure.

The cured polymer exhibited the following physical properties:

| | |
|---|---|
| Tensile Strength, psi | 3366 |
| Elongation, % | 128 |
| Elongation Set, % | 6 |
| Graves Tear | 182.5 |
| Shore A Hardness | 80—80 |
| Shore D Hardness | 45–40 |

-continued

| | |
|---|---|
| 70 Hours at 100° C. | |
| ASTM No. 3 Oil | |
| Weight Increase, % | 26.9 |
| Volume Increase, % | 39.7 |

The oil swell data obtained in this Example is contrary to the data obtained in Examples 4 and 6. These Examples all contain polyethylene, chlorine, and nitrogen. There is no apparent reason for the extraordinary improvement in the resistance of this product to oil swelling. It can only be assumed that an indeterminate error, i.e., a mistake in recording weights or values, occurred. This data is included only to ensure that all of the data obtained in reducing this invention to practice has been made part of the record.

EXAMPLE 4

100 grams of chlorinated polyethylene resin having a bulk density of 28 lbs./cu. ft., melt viscosity of 24 poises/1,000, a 36 percent chlorine content and 0–2 percent residual crystallinity were dissolved in 4,000 grams of carbon tetrachloride. A solution of 50 milliliters of carbon tetrachloride containing 6.0 grams of nitrosyl chloride was added and the mixture was exposed to sunlight. After allowing the reaction to continue for three hours, the polymer, containing 0.42 percent nitrogen and 39.7 percent chlorine, was isolated by evaporation of the solvent at ambient conditions, followed by vacuum drying at room temperature. The elastomer was compounded according to the formulations shown in the Table below and cured for 30 minutes at 300° F. at 35 tons press pressure.

The cured polymer exhibited the following physical properties:

| | |
|---|---|
| Tensile Strength, psi | 2537 |
| Elongation, % | 193 |
| Elongation Set, % | 10 |
| Graves Tear | 186 |
| Shore A Hardness | 80—80 |
| Shore D Hardness | 41–35 |
| 70 Hours at 100° C. | |
| ASTM No. 3 Oil | |
| Weight Increase, % | 43.0 |
| Volume Increase, % | 61.6 |

EXAMPLE 5

Chlorinated polyethylene, 200 grams, having the same composition as noted in Example 3, was slurried with 1.5 liters of 1,1,2-trichlo-1,2,2-trifluoroethane, and 8.0 grams of chlorine in a three-liter flask. The stirred slurry was exposed to sunlight for 60 minutes at which time 5.0 grams of sulfur dioxide, 10.0 grams of chlorine and 10 grams of nitrosyl chloride dissolved in 200 milliliters of 1,1,2-trichloro-1,2,2-trifluoroethane were added and the stirred mixture again exposed to sunlight for a total of 10 hours. The polymer was isolated by filtering the slurry mixture through a sintered glass funnel, dried under vacuum at room temperature to constant weight. Elemental analysis indicated a composition of 0.24 percent nitrogen, 37.51 percent chlorine and 0.40 percent sulfur. The compounding formulation of the cured sample is given in the Table. Standard cures of 30 minutes at 300° F. at 35 tons press pressure were used.

The cured polymer exhibited the following physical properties:

| | |
|---|---|
| Tensile Strength, psi | 3180 |
| Elongation % | 185 |
| Elongation Set, % | 18 |
| Graves Tear | 228 |
| Shore A Hardness | 83–81 |
| Shore D Hardness | 43–36 |
| 70 Hours at 100° C. | |
| ASTM No. 3 Oil | |
| Weight Increase, % | 37.4 |
| Volume Increase, % | 54.1 |

EXAMPLE 6

Employing the procedure of Example 3, a carbon tetrachloride solution was prepared from 100 grams of chlorinated polyethylene, having the same composition as noted in Example 3, and 1.5 liters of carbon tetrachloride. To this mixture 2.0 grams of chlorine and 35 milliliters of carbon tetrachloride were added and the mixture exposed to sunlight for 60 minutes. Subsequently, 5.0 grams of nitrosyl chloride and 80 milliliters of carbon tetrachloride were added and the mixture again exposed to sunlight. Upon allowing the reaction to continue for 90 minutes, the polymer was isolated by evaporation of the solvent at ambient conditions, followed by drying under vacuum at room temperature to constant weight. Elemental analysis indicated 0.17 percent nitrogen, 36.71 percent chlorine and 0.06 percent sulfur. The compounding formulation employed was as noted in the Table. The sample was then cured under standard conditions.

The cured polymer exhibited the following physical properties:

| | |
|---|---|
| Tensile Strength, psi | 3597 |
| Elongation, % | 250 |
| Elongation Set, % | 20 |
| Graves Tear | 222.5 |
| Shore A Hardness | 78—78 |
| Shore D Hardness | 43–32 |
| 70 Hours at 100° C. | |
| ASTM No. 3 Oil | |
| Weight Increase, % | 44.5 |
| Volume Increase, % | 67.4 |

EXAMPLE 7

Employing the procedure of Example 4, 8.0 grams of chlorine was reacted for 60 minutes in the presence of light with 200 grams of chlorinated polyethylene, as described in Example 3, and 1.5 liters of 1,1,2-trichloro-1,2,2-trifluoroethane. To this slurry were added 10.0 grams of nitrosyl chloride in 100 milliliters of 1,1,2-trichloro-1,2,2-trifluoroethane and the mixture was exposed to sunlight for approximately 7 hours before 5.0 grams of sulfur dioxide and 7 grams of chlorine were added and the mixture was again exposed to sunlight for 7.5 hours. The polymer was obtained by filtering the slurry through a sintered glass funnel and drying under vacuum at room temperature to constant weight. Elemental analysis indicated a composition of 0.23 percent nitrogen, 37.35 percent chlorine and 0.30 percent sulfur. The compounding formulations as noted in the Table below were employed and a cure of 30 minutes at 300° F. at 35 tons press pressure was used.

The cured polymer exhibited the following physical properties:

| | |
|---|---|
| Tensile Strength, psi | 2407 |
| Elongation, % | 152 |

|  |  |
|---|---|
| Elongation Set, % | 13 |
| Graves Tear | 215.5 |
| Shore A Hardness | 77—77 |
| Shore D Hardness | 40–35 |
| 70 Hours at 100° C. ASTM No. 3 Oil | |
| Weight Increase, % | 44.5 |
| Volume Increase, % | 66.5 |

EXAMPLES 8–11

Chloronitrosylated polyethylene containing 28.1 percent chlorine and 0.82 percent nitrogen was compounded in a 50—50 blend with chlorosulfonated polyethylene containing 30.44 percent chlorine and 1.21 percent sulfur. The chloronitrosylated and chlorosulfonated polyethylenes were prepared from the same base chlorinated polyethylene which contained 27.1 percent chlorine. These materials were then cured at 300° F. for 30 minutes at 35 tons press pressure and had the following physical properties:

|  | Chloro-sulfonated Polyethylene | Chloro-nitrosylated Polyethylene | Chlorinated Polyethylene |
|---|---|---|---|
| Tensile | 1768 | 1782 | 1210 |
| 100% Modulus | 1490 | 1636 | 1190 |
| Yield Point | 1200 | 1136 | 1081 |
| % Elongation | 204 | 160 | 171 |
| Solubility in ASTM No. 3 Oil | Soluble | Insoluble | Soluble |

These elastomers were compounded according to the following formulations and cured for 30 minutes at 300° F. at 15,000 pounds press pressure.

|  | Examples | | | |
|---|---|---|---|---|
|  | No. 8 | No. 9 | No. 10 | No. 11 |
| Chloronitrosylated Polyethylene | 50 | 50 | — | 100 |
| Chlorosulfonated Polyethylene | 50 | — | — | — |
| Chlorinated Polyethylene | — | 50 | 100 | — |
| Carbon Black | 10 | 10 | 40 | 40 |
| MgO | 10 | 10 | 4 | 4 |
| Stearic Acid | 1 | 1 | 1 | 1 |
| Dipentamethylene-thiuram-hexasulfide | 2 | 2 | — | — |

The physical properties of the cured elastomers are listed below.

|  | Examples | | | |
|---|---|---|---|---|
|  | No. 8 | No. 9 | No. 10 | No. 11 |
| Tensile | 2114 | 1530 | 1802 | 2154 |
| Yield Point | 1232 | 1266 | 1915 | 1848 |

|  | Examples | | | |
|---|---|---|---|---|
|  | No. 8 | No. 9 | No. 10 | No. 11 |
| 100% Modulus | 1778 | 1428 | — | — |
| % Elongation | 200 | 174 | 74 | 79 |
| Oil Swell, Wt. Increase, % | 209 | Dissolves | Dissolves | 264 |

TABLE

COMPOUNDING FORMULATIONS FOR CHLOROSULFONATED/CHLORONITROSYLATED POLYETHYLENES

|  | Examples | | | | | | |
|---|---|---|---|---|---|---|---|
|  | 1 | 2 | 3 | 4 | 5 | 6 | 7 |
| Product | 100 | 100 | 100 | 100 | 100 | 100 | 100 |
| Carbon Black | 40 | 40 | 40 | 40 | 40 | 40 | 40 |
| Magnesium Oxide | 4 | 4 | 4 | 4 | 4 | 4 | 4 |
| Dipentamethylene-thiuram-hexasulfide | 2 | 2 | — | — | 2 | — | 2 |
| Pentaerythritol | 3 | 3 | — | — | 3 | — | 3 |
| Stearic Acid | 1 | 1 | 1 | 1 | 1 | 1 | 1 |

The embodiments of the invention in which an exclusive privilege is claimed are:

1. A process for the preparation of a hydrocarbon polymer containing chlorosulfonic and chloronitroso groups which comprises contacting in the presence of a catalyst said polymer with sulfonyl chloride or sulfur dioxide and chlorine and nitrosyl chloride or chlorine and nitric oxide.

2. The process of claim 1 wherein the catalyst is light.

3. The process of claim 1 wherein the catalyst is a free radical catalyst.

4. The process of claim 1 wherein the polymer is selected from the group consisting of polyolefins, chlorinated polyolefins and chlorosulfonated polyolefins.

5. The process of claim 1 wherein the polymer is a polyolefin.

6. The process of claim 5 wherein the polymer is polyethylene.

7. The process of claim 5 wherein the polymer is chlorosulfonated polyethylene.

8. A chlorosulphonated, chloronitrosylated polymer having a chlorine content from 0.1 weight percent to 68 weight percent, a nitrogen content from 0.1 weight percent to 5 weight percent, a sulfur content from 0.05 weight percent to 5 weight percent prepared by contacting in the presence of a catalyst a hydrocarbon polymer with sulfonyl chloride or sulfur dioxide and chlorine, nitrosyl chloride or nitric oxide and chlorine.

9. A crosslinked chlorosulfonated, chloronitrosylated polymer obtained by heating at a temperature of from 75° to 225° C. the polymer of claim 8.

10. The polymer of claim 9 wherein heating is carried out in the presence of a filler.

11. The polymer of claim 8 wherein said polymer is selected from the group consisting of polyolefins, chlorinated polyolefins and chlorosulfonated polyolefins.

* * * * *